United States Patent
Preston

(10) Patent No.: US 7,178,762 B2
(45) Date of Patent: Feb. 20, 2007

(54) REINFORCING MATERIAL FOR PARACHUTES AND METHODS FOR REINFORCING PARACHUTES

(75) Inventor: Daniel Preston, Kew Gardens, NY (US)

(73) Assignee: Atair Aerospace, Inc., Brooklyn, NY (US)

( * ) Notice: Subject to any disclaimer, the term of this patent is extended or adjusted under 35 U.S.C. 154(b) by 0 days.

(21) Appl. No.: 10/875,980

(22) Filed: Jun. 23, 2004

(65) Prior Publication Data

US 2005/0077431 A1    Apr. 14, 2005

Related U.S. Application Data

(60) Provisional application No. 60/482,646, filed on Jun. 26, 2003.

(51) Int. Cl.
*B64D 17/00* (2006.01)
*B64D 19/00* (2006.01)

(52) U.S. Cl. .................... 244/142; 244/145
(58) Field of Classification Search ......... 244/142–150
See application file for complete search history.

(56) References Cited

U.S. PATENT DOCUMENTS

| | | | | |
|---|---|---|---|---|
| 1,412,800 A | * | 4/1922 | Cooper et al. | 244/145 |
| 3,558,087 A | * | 1/1971 | Barish | 244/142 |
| 3,698,667 A | * | 10/1972 | Studenick et al. | 244/32 |
| 3,724,789 A | * | 4/1973 | Snyder | 244/145 |
| 3,814,355 A | * | 6/1974 | Pepper et al. | 244/145 |
| 3,893,641 A | * | 7/1975 | Sutton | 244/145 |
| 3,972,495 A | * | 8/1976 | Jalbert | 244/145 |
| 4,015,801 A | * | 4/1977 | Womble et al. | 244/145 |
| 4,038,867 A | * | 8/1977 | Andrews et al. | 73/775 |
| 4,399,969 A | * | 8/1983 | Gargano | 244/145 |
| 4,403,755 A | * | 9/1983 | Gutsche | 244/53 R |
| 4,429,580 A | * | 2/1984 | Testa et al. | 73/768 |
| 4,470,567 A | * | 9/1984 | Puskas | 244/145 |
| 4,679,519 A | | 7/1987 | Linville | 114/103 |
| 4,684,082 A | * | 8/1987 | Gargano | 244/142 |
| 4,708,080 A | | 11/1987 | Conrad | 114/103 |
| 4,715,235 A | * | 12/1987 | Fukui et al. | 73/862.68 |
| 4,744,252 A | * | 5/1988 | Stout | 73/768 |
| 5,123,616 A | * | 6/1992 | Buckley et al. | 244/145 |
| 5,333,568 A | * | 8/1994 | Meldner et al. | 114/102.31 |
| 5,470,632 A | * | 11/1995 | Meldner et al. | 428/110 |
| 5,825,667 A | * | 10/1998 | Van Den Broek | 702/141 |
| 6,299,104 B1 | * | 10/2001 | El-Sherif et al. | 244/142 |
| 6,550,341 B2 | * | 4/2003 | van Schoor et al. | 73/775 |
| 6,565,042 B1 | * | 5/2003 | Yamada | 244/145 |
| 6,575,041 B2 | * | 6/2003 | Schwarz et al. | 73/780 |
| 6,802,216 B2 | * | 10/2004 | van Schoor et al. | 73/159 |
| 2002/0134890 A1 | * | 9/2002 | Berzin | 244/142 |
| 2002/0172792 A1 | * | 11/2002 | Jarvis et al. | 428/57 |
| 2003/0056599 A1 | * | 3/2003 | van Schoor et al. | 73/777 |
| 2004/0009729 A1 | * | 1/2004 | Hill et al. | 442/208 |
| 2005/0077431 A1 | * | 4/2005 | Preston | 244/145 |
| 2005/0151007 A1 | * | 7/2005 | Cadogan et al. | 244/35 R |

* cited by examiner

*Primary Examiner*—Teri Pham Luu
*Assistant Examiner*—Stephen A Holzen
(74) *Attorney, Agent, or Firm*—Bourque and Associates

(57) ABSTRACT

A parachute is formed using a non-woven composite material. The non-woven composite material is formed by fusing a plurality of mono-filament fibers between thin layers of plastic. The non-woven material may be used as reinforcing tapes or as parachute lines in connection with a parachute of typical construction.

3 Claims, 5 Drawing Sheets

REINFORCING MATERIAL FOR PARACHUTES AND METHODS FOR REINFORCING PARACHUTES

PRIORITY

The present application claims priority under 35 U.S.C. §119(e) to U.S. provisional patent application Ser. No. 60/482,646, filed Jun. 26, 2003, the entire disclosure of which is herein incorporated by reference.

BACKGROUND OF THE INVENTION

1. Field of the Invention

The present invention relates to construction of parafoils and parachutes. More particularly, it relates to use of a composite, non-woven material for parafoils and parachutes and methods of reinforcing such devices using such material as a reinforcing tape.

2. Background

Parachutes, both decelerator type and ram-air, gliding wing type, are typically constructed from rip-stop nylon fabric. Rip-stop nylon is a square woven fabric, with the warp and weft fibers being positioned at 90 degrees to each other. The material is then typically treated with a silicone based chemical and calanderized to fill in the pores of the fabric to reduce its porosity and control air flow through the fabric. The treatment causes the fabric to become slick and non-stick.

The material as used in parachutes, must have various qualities, such as:

good tear strength (even after many hours exposed to Ultra Violet rays (UV);
low permeability to keep the cells pressurized;
light weight for better inflation; and
reduced packing volume.

Rip-stop nylon has advantages in weight, tear strength and longevity. The chemical make up of coatings and how they are applied to the fabric also affect the qualities of the final product.

Parachutes are designed to have a specific form during flight and is constructed from various panels which are shaped and put together to achieve the desired form. However, during flight, the fabric is subjected to complex mechanical and aerodynamics stresses which stress the fabric along the direction of its laid fibers, and in various patterns at a bias to the weave. As such, the actual shape of the assembled panels and the resulting inflated structure during flight, distort away from the desired modeled shape.

To combat this problem, the construction of a parafoil or parachute generally includes heavy narrow woven fabric tapes (or webbing) that is stitched into the structure to restrain the fabric panels into a shape closer to that modeled. However, the inclusion of reinforcing tape in the design adds packing volume and construction complexity.

Other problems with woven fabric reinforcing tapes include: inherent stretchability in various directions (the degree of stretch depends on the fiber, type of weave, and the directions of the stresses) and shrinking from exposure to water and abrasion from absorbed particles and mildew.

The construction of parafoils and parachutes with rip-stop nylon panels and reinforcing tapes is also subject to construction tolerance errors by the nature of the sewing construction process. Specifically, due to the slick coating material, and the low tolerances in the design of parachute, highly skilled workers are required to construct a parachute. Even with highly skilled labor, the parachute is subject to inaccuracies during construction. For example, since the seams are tensioned by the sewing process and shrink, the accuracy of the constructed shape with respect to the design is limited.

For example, a common seam in a parachute involves three overlaying fabric panel edges plus a reinforcing tape. The reinforcing tape is rolled over and stitched over the entire length with a double needle lockstitch. It is extremely difficult to hold tolerances of several millimeters on match marks during this sewing process. Moreover, accumulative errors along a span of an average personnel parachute can amount to several inches. Thus, even before additional distortions are created due to stresses on the fabric, the parachute shape may vary from the design.

It is also difficult to test parachute designs or to obtain accurate data relating to parachute performance during flight, such as pressure distributions, air flows, and material shape, movement and stress. Obtaining such information has been attempted using wind tunnels. However, only two wind tunnels exist in the United States which are large enough for small to medium sized parachutes. Also, wind tunnels cannot provide accurate information regarding actual flights. The conditions in an wind tunnel are perfect and constant and do not necessarily reflect conditions during flight.

SUMMARY OF THE INVENTION

Embodiments of the present invention address the problems outlined above and present a strong, flexible material to keep a parafoil or parachute more in accordance with its intended design.

In some embodiments of the present invention, a flexible composite fabric is used for construction of parafoils or parachutes, and in particular, the flexible composite fabric is used as a reinforcing tape for parafoils and parachutes. The composite fabric may be formed of thin sheets of plastic or polyester film and fibers of a high strength material (e.g., ultra high molecular weight polyethylene). Such a material may include those materials disclosed in U.S. Pat. No. 5,333,568 and U.S. Pat. No. 5,470,632, each disclosure of which, in its entirety, is herein incorporated in the present application by reference. The high strength fibers may be placed in the material to control the strength and resistance to stretch of the reinforcing tapes made from such composite materials. In some embodiments, this allows the parachute shape to be better maintained in a desired shape during flight. According to another aspect of the invention, such composite fabric tapes may also be used as parafoil/parachute lines.

Reinforcing tapes according to embodiments of the present invention may be differentiated from woven tapes is that fiber reinforced plastic tapes, or fiber reinforced or unreinforced laminate tapes have little to no "crimp". Thus, reinforcing tapes according to the present invention (i.e., composite tapes) stretch significantly less than woven tapes, are more dimensionally stable, and are inherently sealed and waterproof, for example.

Accordingly, in one embodiment of the present invention, a parachute includes a canopy comprising a plurality of panels affixed together, a plurality of suspension lines for suspending a payload from the canopy and reinforcing tape affixed to the canopy at predetermined locations. The reinforcing material may comprise a lower film, an upper film and a plurality of mono-filaments provided there between.

The reinforcing tape may further include at least one of a sensor and a circuit provided between the upper film and lower film. In addition, the parachute according to this and other embodiments, may be affixed to one or more seams established by the assembly of the plurality of panels.

In another embodiment of the present invention, a method for constructing a parachute may include forming a plurality of parachute panels of a first material and affixing the plurality of parachute panels together in a predetermined manner. The plurality of joints may be formed at the junctures between affixed panels. The method may also include affixing reinforcing tape to at least the joints in a predetermined position. The reinforcing tape may include a lower film, an upper film and a plurality of mono-filaments provided there between.

DETAILED DESCRIPTION OF SOME OF THE EMBODIMENTS

Figure 1:
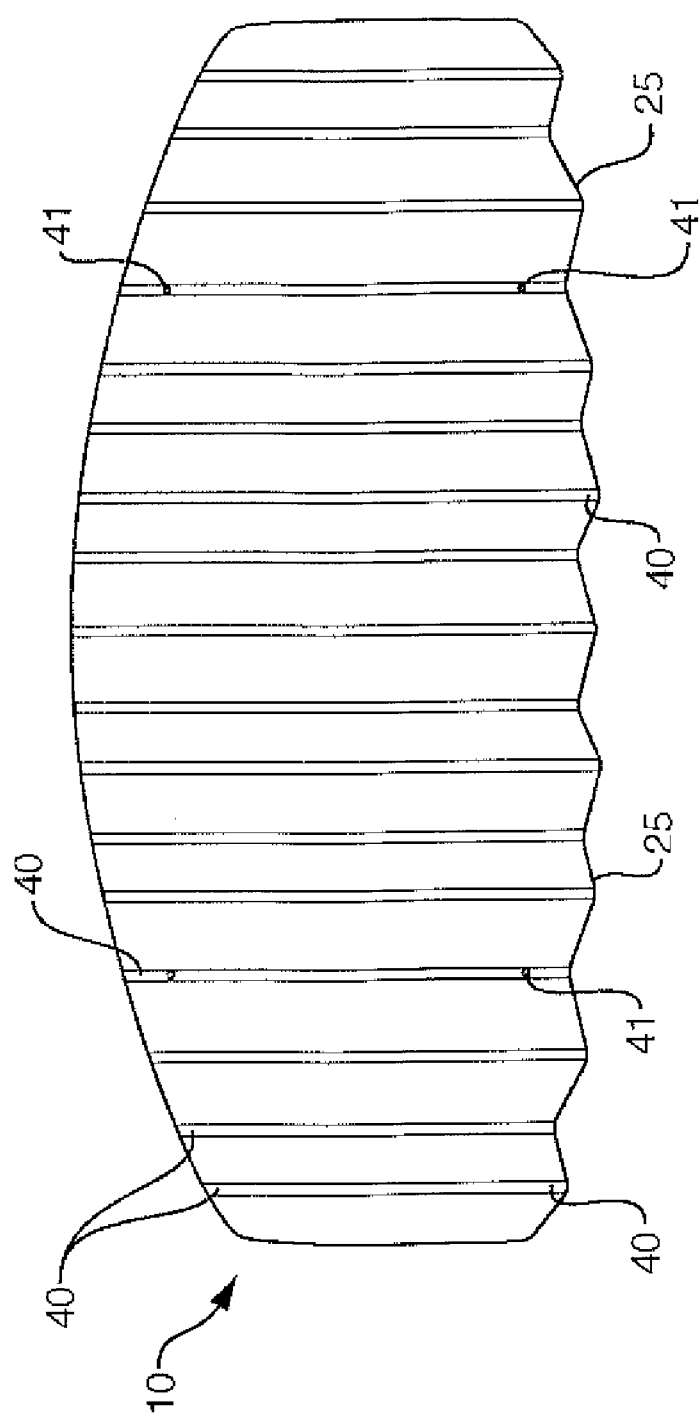
FIG. 1 illustrates a top view of a typical design for construction of a ram-air parachute.
Figure 2:
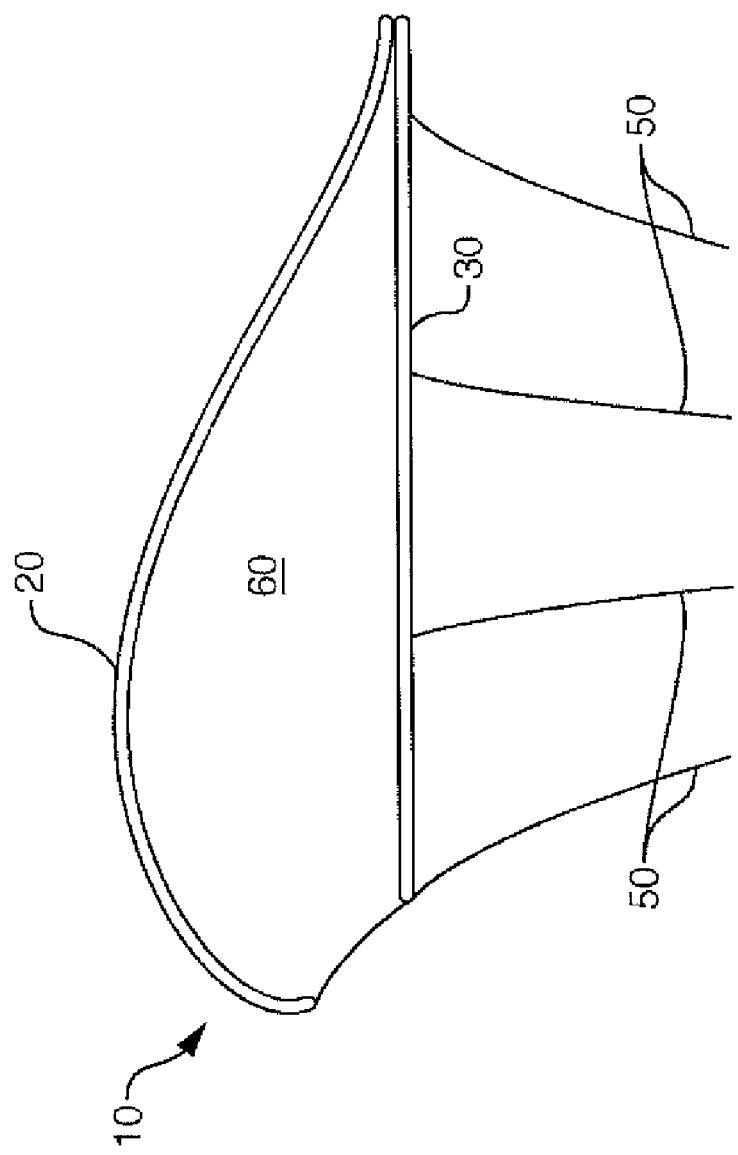
FIG. 2 illustrates a cross-sectional, side view of the ram-air parachute of FIG. 1.
Figure 3:
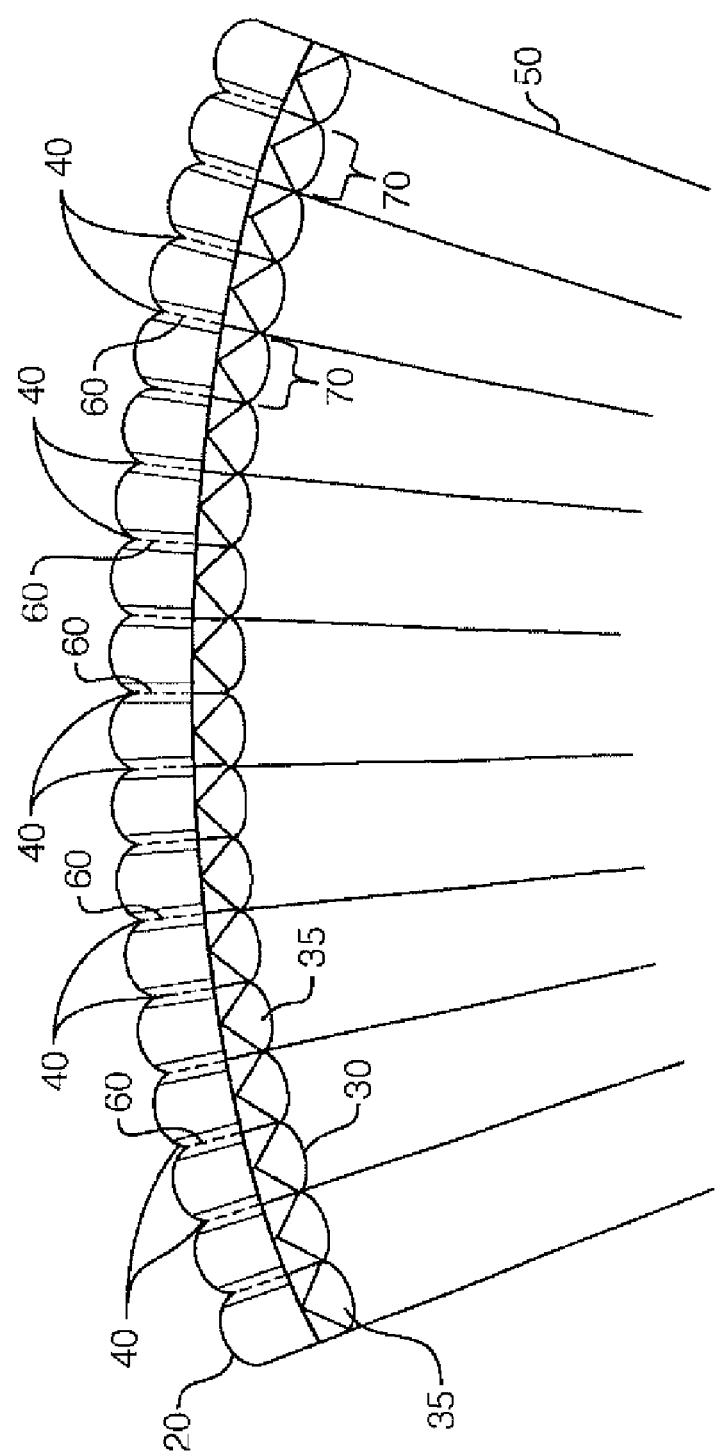
FIG. 3 illustrates a front view of the ram-air parachute shown in FIGS. 1 and 2.

FIGS. 1–3 illustrate a canopy of a typical ram air parachute 10. The ram air parachute 10 includes a top skin 20 and bottom skin 30. A plurality of vertical ribs 60 are formed between the top skin 20 and the bottom skin 30 forming a plurality of cells 70. Suspension lines 50 may be attached to at least some or all of the plurality of ribs. Generally, suspension lines are attached to every other rib in the ram air parachute. The suspension lines may be connected together to provide proper suspension of the user/cargo below the canopy and maintain the structure and the orientation of the canopy with respect to the pilot/cargo. In order to protect edges and prevent stretch, reinforcing tapes are sewn with one or more seams, and preferably, all seams. Additionally, reinforcing tape 40 may be placed at the seams of the canopy panels, along open edges 25 of the parachute, and at the inlets 35 in the front of the parachute, and may also be sewn onto the ribs of the parachute to help maintain their shape (since most parachutes are designed to have a specific shape for flight though the air).

Figure 4A:
FIGS. 4A–4E illustrate the resulting shapes in flight of various rib constructions due to tresses.
Figure 4B:
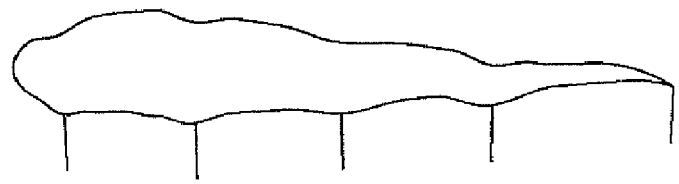
Figure 4C:

Distortions in shape greatly affect the flight characteristics of the parachute. FIGS. 4A–E illustrate the shape distortions on a parachute rib. FIG. 4A represents the desired rib shape. Due to the stresses, an un-reinforced rib would have the shape illustrated in FIG. 4B, which differs significantly from the desired shape. However, by changing the way a rib is cut, for example, the in-flight shape may be improved. To that end, FIG. 4C illustrates the shape of an un-reinforced rib that has been cut so that the warp is 45° to the cord of the rib. This results in a significant improvement in shape, but still has some distortions around the shroud attachment points.

Figure 4D:
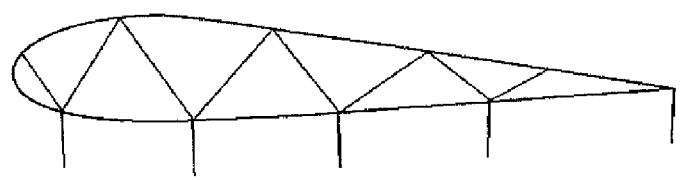
Figure 4E:
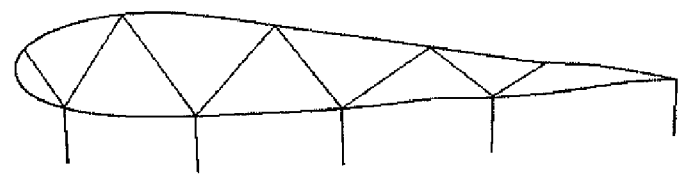
Figure 5A:
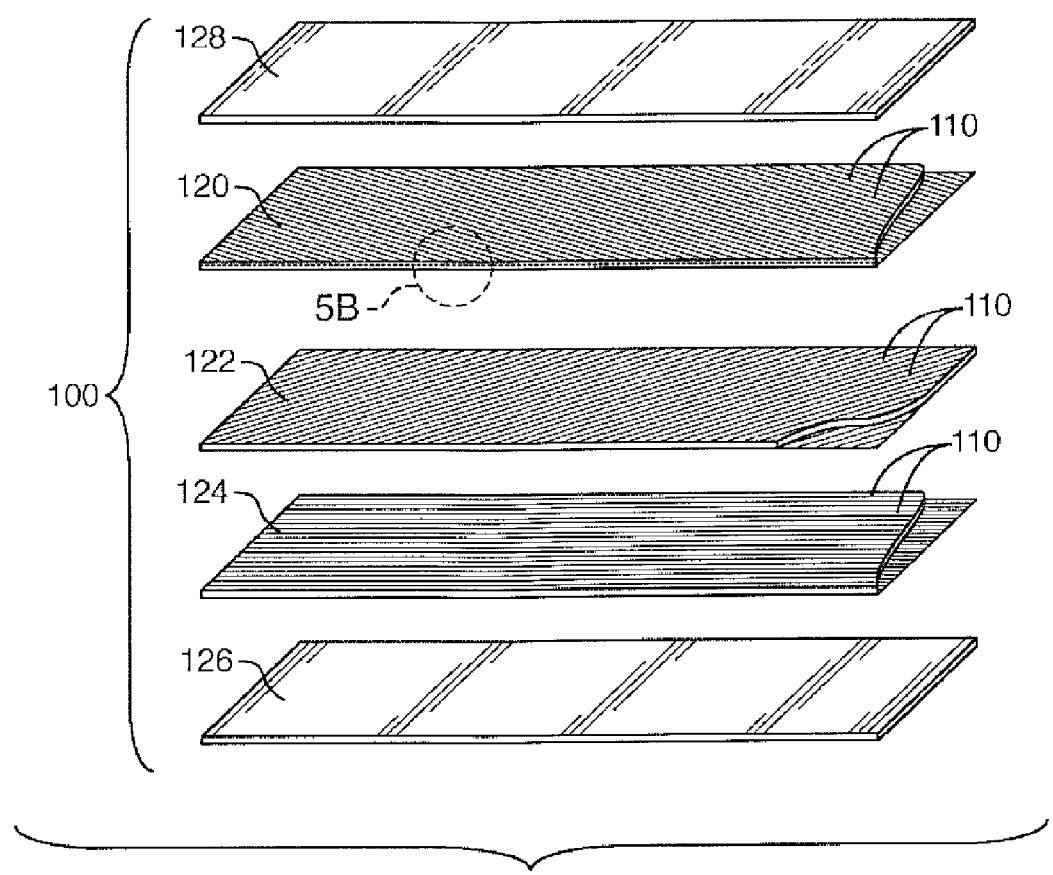
FIG. 5 is an exploded view of a composite material according to an embodiment of the resent invention.
Figure 5B:
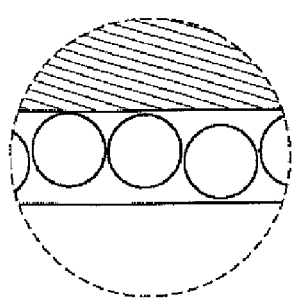

With prior art reinforcing tapes attached to the rib in a triangular pattern, the in-flight shape of the parachute is further improved, as illustrated in FIG. 4D. Finally, by using a reinforcing tape material according to embodiments of the present invention, the in-flight shape is closer yet to the desired shape (see FIG. 4E).

According to the present invention, a flexible composite fabric is used for at least some of the reinforcing tape applications on a parachute, and in some embodiments, is used preferably for all the reinforcing tape applications on a parachute. A reinforced material 100 used in such embodiments is illustrated in n in FIG. 3 (exploded view). Fibers 110 of a high strength material are laid, in layers 120, 122 and 124 on an extremely thin film (e.g., a sheet of plastic) 126. The material may be plastic, e.g., a polyester film, Mylar, or other similar material. The fibers 110 may be of spectra, Kevlar, HMA, carbon fiber or other high strength material having properties to any one or more of the foregoing. A second sheet of material (e.g., sheet of plastic, which may be similar to 126) 128 may be placed on top of the fibers, and then the entire structure may be fused together using heat and/or pressure.

Such a material is described in U.S. Pat. No. 5,333,568 entitled, "Material for the Fabrication of Sails" and U.S. Pat. No. 5,470,632 entitled "Composite Material for Fabrication of Sails and Other Articles", both incorporated herein in their entirety by reference. The material 100 may be constructed using unidirectional layers ("uni-tapes") 120, 122 and 124, each having extruded monofilaments, for example, in a pultruded tape, located between an upper film 128 and a lower film 126, with each uni-tape having an approximate thickness of 10 microns, for example. The thickness typically may be between 5 micron and 100 microns, more preferable between 5 microns and 25 microns, and most preferable between 7 microns and 15 microns. Each uni-tape may be provided with 50 to 85 percent monofilaments by volume with the monofilaments being provided with a carrier of bonding resin which forms a matrix that includes monofilaments and resin. Each of the uni-tapes may include longitudinal monofilaments 110 which extend from one edge of the completed uni-tape to the other in a single direction. The uni-tapes may be placed in different directions in each layer so that the fibers may be positioned along different paths. The resulting sheet is a non-woven flexible composite fabric which is considerably lighter, thinner and stronger than rip-stop nylon. Additionally the strength and resistance to stretch is designed into the fabric. Moreover, the reinforcing tapes according to embodiments of the present invention may be manufactured via a modified batch process—resulting in a continuous reel to reel process.

The laminated fabric may then be cut into narrow strips to be used as reinforcement tapes on a parachute. Such laminated fiber tapes, according to some embodiments, may exhibit zero or near zero stretch or shrink, may be waterproof, and may not absorb little to any water, particles or mildew. Additionally, they are stronger and have less weight and volume, allowing a reduction in pack volume of deployable parachutes and parafoils.

Additionally, the use of the composite material for reinforcement tapes allows improved experimentation with fibers for parachute uses. The woven webbing tapes used on parachutes are typically produced on extremely high volume machines, and the industry has not been able to make use of major developments of stronger lighter fibers because it can not justify the expense of large minimum setup runs. However, with the laminated fiber approach, according to embodiments of the present invention, small batch runs may be produced, which are economical and allow new fibers or mixtures of new fibers, for example, and experimentation to take place. Additionally multiple fiber types can be mixed and fiber direction controlled in ways not possible with woven fabrics.

Laminated tapes may also be used as parachute lines. Specifically, some embodiment so of the present invention allow flat ribbons with encapsulated thin fibers to be used or a single encapsulated braided fiber strand.

Furthermore, using laminated composite construction for reinforcement tapes or parachute lines enables wires, circuitry and other sensors 41 to be easily integrated into the structure of the parachute. For example, fiber optic strain gauges, wires and small electronic circuits and sensors can be laid into the laminate and fused in during formation of the material. Alternatively, since bonding is possible with the material, gauges, wires, circuitry or sensors can be bonded to the material after formation. Accordingly, sensors in the tapes or lines can be used to study stresses, monitor parachute deployment, or determine the condition and need for replace of parachute parts.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention.

What is claimed is:

1. A parachute comprising:

a canopy comprising a plurality of panels affixed together;

a plurality of suspension lines for suspending a payload from the canopy;

reinforcing tape affixed to the canopy at predetermined locations, said reinforcing material comprising a lower film, an upper film and a plurality of layers of monofilaments provided there between, wherein a longitudinal axis of at least one layer of said plurality of layers of non-filaments is substantially arranged in at least one direction of stress of said predetermined locations; and at least one sensor laminated between said upper and said lower film of said reinforcing tape.

2. The parachute according to claim 1, wherein the reinforcing tape is affixed to one or more seams established by the assembly of the plurality of panels.

3. The parachute according to claim 1, wherein the reinforcing tape includes one or more electrical wires for conducting electrical signals.

* * * * *